United States Patent Office 3,485,648
Patented Dec. 23, 1969

3,485,648
DEVITRIFYING SOLDER GLASS
Frederic L. Bishop, Toledo, Ohio, assignor to Owens-Illinois, Inc., a corporation of Ohio
Filed May 3, 1966, Ser. No. 547,305
Int. Cl. C03c 27/00, 3/10; C04b 37/00
U.S. Cl. 106—53          9 Claims

ABSTRACT OF THE DISCLOSURE

Three thermally divitrifiable solder glasses for sealing glass to glass, ceramics, metal or alloys, for sealing metal to metal and for sealing ceramics to ceramics. The first composition consists essentially, in weight percent, of 1.5–2.5 $SiO_2$, 7.5–10 $B_2O_3$, 70–80 PbO, 10–15 ZnO and 0.5–2.5 $F_2$, less about 0.1 to about 1.0 weight percent oxygen equivalent. The second composition consists essentially, in weight percent, of 1.5–2.5 $SiO_2$, 7.5–10 $B_2O_3$, 70–80 PbO, 10–15 ZnO, 1–3 BaO and 0.5–2.5 $F_2$, less about 0.1 to about 1.0 weight percent $O_2$. The third composition consists essentially, in weight percent, of 0.75–1.25 $SiO_2$, 8–10 $B_2O_3$, 72–78 PbO, 10–15 ZnO, 0.2–2 CuO and 0.5–2.5 $F_2$, less about 0.2–0.6 weight percent $O_2$.

The present invention relates to novel glass compositions. More particularly, the instant invention pertains to thermally devitrifiable sealing glasses, which glasses will undergo devitrification at relatively low temperatures.

Sealing or solder glass compositions are of importance for many endeavors, for instance, in research, for general industrial application, and in the electronics fields for sealing or soldering glass-to-glass, glass-to-ceramics, glass-to-metal, metal-to-metal, glass-to-alloy, ceramic-to-ceramic, and the like. In the electronic art, sealing glass is conventionally employed for the fabrication of miniature tubes, headlights, power tubes, cathode-ray tubes, television tubes, and for encapsulating sensitive electronic components such as diodes, transistors, power rectifiers, and like electronic components. The electronic moities as employed for the above-mentioned endeavors are often adversely affected by excessively high thermal conditions, and if they are subjected to these conditions for prolonged periods, as are sometimes necessary to effect the required sealing with the conventional or the prior art solder glasses, the normal performance of the delicate electronic instrument may be dampened, irrepairably damaged, or the like. Also many of the presently existing solder glasses as employed for the above fabrications often produce distortion of the surface to be sealed, and sometimes very thin hairline cracks form within the structure of the sealing glass. These results tend to make a good vacuum extremely difficult to obtain. These and other problems intimately associated with the sealing glasses are very serious as the seal might fail or perform unsatisfactorily under the desired conditions, or it may be necessary to remanufacture or reseal the article of commerce only with the accompanying economic loss.

It will be appreciated by those skilled in the sealing art that if sealing glasses are compounded which seal and devitrify at the lowest possible temperatures and with a reduced holding time, the inherent tendency to avoid thermal shock to sensitive electronic components would satisfactorily increase the usefulness of the sealing glass. Likewise, it will be appreciated by those versed in the art that if sealing glasses are provided with good physical and sealing properties to produce an acceptbale seal for the production of articles of commerce, with said seals essentially avoiding the pitfalls of the prior art, said sealing glass composition would have a definite commercial value and would also represent a useful contribution to the art.

Accordingly, it is an object of tnis invention to provide novel sealing glass compositions.

Another object of this invention is to provide novel devitrifying sealing glass compositions.

A still further object of the present invention is to provide novel devitrifying solder glass compositions which possess reduced sealing temperatures.

Yet another object of the present invention is to provide novel devitrifying sealing glasses which crystallize in a shorter time at the desired holding temperature.

Yet a still further object of this invention is to provide devitrifying solder glasses that possess a devitrifying sealing range of about 335° C. to about 375° C.

A still further object of the instant invention is to provide solder glasses that possess a lowered softening point.

A still further object of this invention is to provide sealing glasses for glass-to-glass, glass-to-metal, and the like for fabrication of articles of research and industry.

Other objects, features and advantages of the instant invention will become evident from the following detailed description of the mode and manner of the disclosed and claimed invention.

In attaining the above and other objects of the present invention, it has now been surprisingly and unexpectedly found that devitrifying sealing glass compositions can be formulated which possess a lowered maturing temperature, generally about 50° C. Thus, according to the present invention, there are provided compositions which contain $SiO_2$, $B_2O_3$, PbO, ZnO, CuO, BaO, and F, a sealing composition containing the ingredients $SiO_2$, $B_2O_3$, PbO, ZnO, BaO, and F, and a sealing glass composition containing the components $SiO_2$, $B_2O_3$, PbO, ZnO, and F.

Glasses, as generally understood by those versed in the art, are commonly analyzed for the metals, and the composition is reported on the basis of the normal oxide of each cation so analyzed. However, when fluorine is present, it is actually present as a fluoride of one or more of the cations in the glass or similarly bound in the glass structure, but it is analyzed separately and reported as fluorine, F. Actually, of course, the fluorine replaces part of the oxygen in the oxides of the composition. Thus, the sealing glasses of the present invention contain the following cations as oxides and/or fluorides but expressed on an oxide basis in weight percent as follows: $SiO_2$, PbO, $B_2O_3$, ZnO, and BaO, and (in excess of 100% expressed on the same oxide basis fluorine) F. Of course, it should be understood that the amount of combined oxygen actually present in the glass is less than that so expressed in the foregoing oxide basis by an amount chemically equivalent to the fluorine present in the glass.

The novel sealing glass compositions of the instant invention which possess a lowered matured temperature comprise about 0.75 to about 1.25 weight percent $SiO_2$, about 8 to about 10 weight percent $B_2O_3$, about 72 to about 78 weight percent PbO, about 10 to about 15 weight percent ZnO, about 0.2 to about 2 weight percent CuO, and about 0.5 to about 2.5 weight percent $F_2$ (less about 0.2 to about 0.6 weight percent $O_2$); a sealing glass composition comprising about 1.5 to about 2.5 weight percent $SiO_2$, about 7.5 to about 10 weight percent $B_2O_3$, about 70 to about 80 weight percent PbO, about 10 to about 15 weight percent ZnO, about 1 to about 3 weight percent BaO, and about 0.5 to 2.5 weight percent $F_2$ (less about 0.1 to about 1.0 weight percent $O_2$); and a solder glass composition comprising about 1.5 to about 2.5 weight percent $SiO_2$, about 7.5 to about 10 weight percent $B_2O_3$, about 70 to about 80 weight percent PbO, about 10 to about 15 weight percent ZnO, about 0.5 to about 2.5 weight percent $F_2$ (less about 0.1 to about 1.0 weight percent oxygen equivalent).

The devitrifiable sealing glass compositions of the invention generally seal at about 340° C. to about 375° C. This low sealing temperature range was unexpectedly achieved by the addition of varying concentrations of fluorine to the glass compositions to produce the solder glasses of the present invention.

The sealing glasses of the present invention are prepared by conventional glass forming procedures. The glass making components in powder form are intimately mixed by hand or in a power blender and are intimately melted together with constant stirring in the conventional manner in a platinum, or a platinum-rhodium crucible. The crucibles are electrically or gas heated. The temperature range for preparing the subject glasses generally is about 2000° F. to about 2250° F., and the melting was performed in an air atmosphere to obtain the homogenous seal glass compositions.

| Component: | Weight percent |
|---|---|
| $SiO_2$ | 0.9 |
| PbO | 76.0 |
| ZnO | 12.2 |
| $B_2O_3$ | 9.4 |
| CuO | 0.9 |
| $F_2$ | 1.1 |
| $O_2$ | −0.4 |

The glass had a softening point of 327° C., a glass edge on a boat test of 326° C., and a devitrifying edge on a boat test of 349° C. The unexpected result for this glass lies in the sudden and complete crystallization at short times and low temperatures.

The following batch materials, weight percent and melting procedures for the sealing glass compositions, as reported in Table I, were prepared in a manner similar to that described in Example 1.

TABLE I

| Batch materials, grams | Ex. 2 | Ex. 3 | Ex. 4 | Ex. 5 | Ex. 6 |
|---|---|---|---|---|---|
| Ottawa sand | 13.1 | 50.1 | 50.1 | 50.1 | 50. |
| Red lead | 750 | 1,936 | 1,936 | 3,882 | 3,882. |
| Zinc oxide | 117 | 269 | 215 | 433 | 432. |
| Boric acid | 146 | | | | |
| Barium silica fluoride | 37 | | | | |
| Zinc fluoride | 13.4 | 68.1 | 136.1 | 272 | 272. |
| Boric anhydride | | 234.8 | 235 | 478 | 478. |
| Cupric oxide | | | | 50 | 50. |

| Components: | Weight percent | | | | |
|---|---|---|---|---|---|
| $SiO_2$ | 2.08 | 1.99 | 1.98 | 0.99 | 1.00. |
| PbO | 74.14 | 75.48 | 75.05 | 75.23 | 76.10. |
| BaO | 2.01 | | | | |
| ZnO | 12.48 | 12.76 | 12.68 | 12.69 | 12.84. |
| $B_2O_3$ | 8.17 | 9.20 | 9.14 | 8.96 | 9.06. |
| $F_2/O_2$ | 1.98/−0.83 | 1.00/−0.42 | 1.98/−0.83 | 1.98/−0.83 | 2.00/−0.84. |
| CuO | | | | 0.99 | |

| | Melting Procedure | | | | |
|---|---|---|---|---|---|
| Melting temperature, °F | 2,000 | 2,100–2,200 | 2,000 | 2,000 | 2,000. |
| Melting time | 1 hour, 5 min | 20 min | 20 min | 2 hours, 15 min | 2 hours, 15 min. |
| Crucible | Plat.-Rh | Plat.-Rh | Plat.-Rh | Plat.-Rh | Plat-Rh. |
| Stirring | Constant | Constant | Constant | Constant | Constant. |
| Furnace | Electric | Electric | Electric | Electric | Electric. |

The batch materials employed for preparing the subject glasses were of the highest purity and generally selected from the following commercially available materials: red lead, Ottawa sand, zinc oxide, boric anhydride, boric acid, cupric oxide, boric acid, flint sand, silicon dioxide, zinc fluoride, sodium fluoride, lead fluoride, barium silica fluoride, barium fluoride, and the like. Of course, other functionally equivalent materials obvious to those versed in the art may be employed.

The following examples of representative compositions of the instant invention are merely illustrative and are not to be considered as limiting the invention.

EXAMPLE 1

The following components were intimately melted together in the following proportions to prepare a novel glass of the invention.

| Component: | Weight in grams |
|---|---|
| Ottawa sand | 50.1 |
| Red lead | 3882 |
| Zinc oxide | 433 |
| Boric anhydride | 478 |
| Cupric oxide | 50 |
| Zinc fluoride | 272 |

The temperature of melting was about 2000° F. The batch was melted in a platinum-rhodium crucible, with constant stirring in an electric heated furnace.

From the above, it will be seen that the composition of the resulting glass was as follows:

Other representative compositions of the present invention prepared in the manner described above are the sealing glasses listed in Table II as Examples 7 and 8.

TABLE II

| Component | Percent by weight | |
|---|---|---|
| | Example 7 | Example 8 |
| $SiO_2$ | 2.06 | 0.93 |
| $B_2O_3$ | 8.30 | 9.41 |
| BaO | 1.84 | |
| PbO | 74.3 | 76.0 |
| ZnO | 12.64 | 12.16 |
| $F_2/O_2$ | 1.40/−0.59 | 1.05/−0.44 |
| CuO | | 0.94 |

The novel solder glasses of the present invention were further tested by standard glass evaluation tests to demonstrate the unexpected results of the subject glasses. The tests performed were the gradient boat test, button flow test, stress test and differential thermal analysis test. The results obtained for the novel subject sealing glasses were compared with the results obtained for a similar, but essentially fluorine free, solder-type glass.

The gradient boat test was conducted in a gradient furnace with a gradient of temperature from one end of about 300° C. to about 500° C. at the other end of the furnace. An eight or ten inch boat is filled with the solder glass to be tested and placed in the furnace for one hour. At the hour's end, the boat is removed and cooled quickly. The results are given by the temperature of the vitreous edge, where the powder turns to glass, and the devitrified edge, where the transparent glass changes to the ceramic-like devitrified appearance.

The button flow test is employed to determine the flow characteristics of a given solder glass. The test aids in demonstrating the filleting properties of the glass which can be related to actual seal filleting. The test consists essentially in making pellets of the powder solder glass under a pressure of 1000 p.s.i., placing the compressed pellets on a glass plate and heating said button in a furnace. The furnace is heated at about 7.5° per minute, or 10° per minute up to 450° C., holding the temperature at the soak or hold time, usually 425° C., 440° C., 450° C., or the like for 1 hour, and then cooling the button at a rate of about 3° C. per minute. The diameter of the heat-treated button is measured and compared against a standard similarly treated button.

A seal stress test was conducted to determine if the glass can be satisfactorily processed without seal breakage due to high seal stress or seal compression. The test is performed by intimately mixing the seal glass with a conventional vehicle, and a given amount of the sealing glass is sealed to a flat piece of standard glass. The seals are examined with a polariscope, and the results are expressed herein as pounds per square inch (p.s.i.). The stress measurements are expressed in the solder glass even though they are read in the base glass. For example, if the stress reading is 500 p.s.i. compression in the base glass, it would be expressed as 500 p.s.i. tension in the solder glass.

The differential thermal analysis test consists essentially in comparing the heating, holding and cooling characteristics for the subject glasses against the heating, holding and cooling characteristics of a given standard glass. Generally, the glasses to be tested are heated at about 10° C. per minute, and at the annealing point of the respective glasses a slight drop appears in a plotted curve. This is believed to be an endothermic reaction, that is where the sample absorbs more heat. After this dip, there is usually a peak at the softening point, and as the temperature reaches higher points, the curve begins to rise as an exothermic reaction begins. The exothermic reaction is the onset of the crystallization phase. The temperature is maintained at this later temperature, usually for one hour; and a peak in crystallization appears followed by a drop-off to the base line. By noting the drop off, the holding crystallization time for a given glass can be generally ascertained. Solder glass compositions containing fluorine were compared with similar solder glasses essentially free of fluorine, and it was generally observed that a longer holding temperature, usually about one hour, is necessary to effect crystallization for fluorine-free compositions, but with solder glasses containing about 1 or 2 percent fluorine, it was unexpectedly observed that crystallization is completed in about 15 minutes. The holding temperature can be defined as the temperature and the time during which nucleation and crystallization takes place, and, therefore, devitrification can be characterized as a time-temperature relationship.

The results for the test presented supra are listed in Table III. In the table, the chemical composition of the examples, expressed as weight percent is as follows:

TABLE II-A

| | Example | | | | | | | | | |
|---|---|---|---|---|---|---|---|---|---|---|
| | 9 | 10 | 11 | 12 | 13 | 14 | 15 | 16 | 17 | 18 |
| $SiO_2$ | 2 | 2.1 | 2.1 | 2.1 | 2 | 2 | 2 | 1 | 1 | 1 |
| PbO | 75.7 | 74.8 | 74.6 | 74.2 | 76 | 75.5 | 75.1 | 76.1 | 75.7 | 75.2 |
| $B_2O_3$ | 8.2 | 8.2 | 8.2 | 8.2 | 9.3 | 9.2 | 9.1 | 9.1 | 9 | 8.9 |
| ZnO | 11.8 | 12.6 | 12.6 | 12.5 | 12.8 | 12.8 | 12.7 | 12.8 | 12.8 | 12.7 |
| BaO | 1.8 | 2 | 2 | 2.0 | | | | | | |
| CuO | | | | | | | | 1 | 1 | 1 |
| $F_2$ | | 0.5 | 1 | 2.0 | | 1 | 2 | | 1 | 2 |

The glass composition used for the stress studies consists of 63.5% $SiO_2$, 4.4% $Al_2O_3$, 10.3% $K_2O$, 7.3% $Na_2O$, 5.2% CaO-MgO, 0.1% $As_2O_3$, 0.3% $Sb_2O_3$, 7.5% BaO, 0.1% $Li_2O$. This latter glass had an annealing point of about 488° C. and a thermal coefficient of expansion of $98.5 \times 10^{-7}/°$ C. (0–300° C.). The glass of Example 15 was compared against a glass for the stress studies consisting of 40% $SiO_2$, 2.5% $Al_2O_3$, 21% $K_2O$, 12% $Na_2O$, 3.5% CaO, and 2.2% MgO. This glass has an annealing point of about 446° C. and an expansion coefficient, 0–300° C., $\times 10^{-7}/°$ C. of 174.

TABLE III

| | Example | | | | | | | | | |
|---|---|---|---|---|---|---|---|---|---|---|
| Test | 9 | 10 | 11 | 12 | 13 | 14 | 15 | 16 | 17 | 18 |
| Gradient boat: | | | | | | | | | | |
| Glass edge | 370 | 350 | 351 | 336 | 355 | 335 | 321 | 335 | 332 | 326 |
| Devitrification edge | 430 | 393 | 388 | 360 | 388 | 363 | 338 | 390 | 361 | 349 |
| Glassy range | 60 | 43 | 37 | 24 | 33 | 27 | 17 | 35 | 29 | 23 |
| Button Test: Average Diameter | 1.122 | 0.959 | 0.939 | 0.832 | 0.988 | | | 0.824 | 0.823 | 0.770 |
| Stress: | | | | | | | | | | |
| Tension, p.s.i.[1] | 900 | | 235 | | 825 | | 340 | | 650 | 2450 |
| Compression, p.s.i. | | 275 | | | | 1050 | | 940 | | |
| Softening point | 375 | 364 | 362 | 345 | 372 | | | 361 | 341 | 327 |

[1] Stress measured against a known glass

The accompanying figures depict results which were obtained for the differential thermal analysis tests as described supra.

Figure 1:
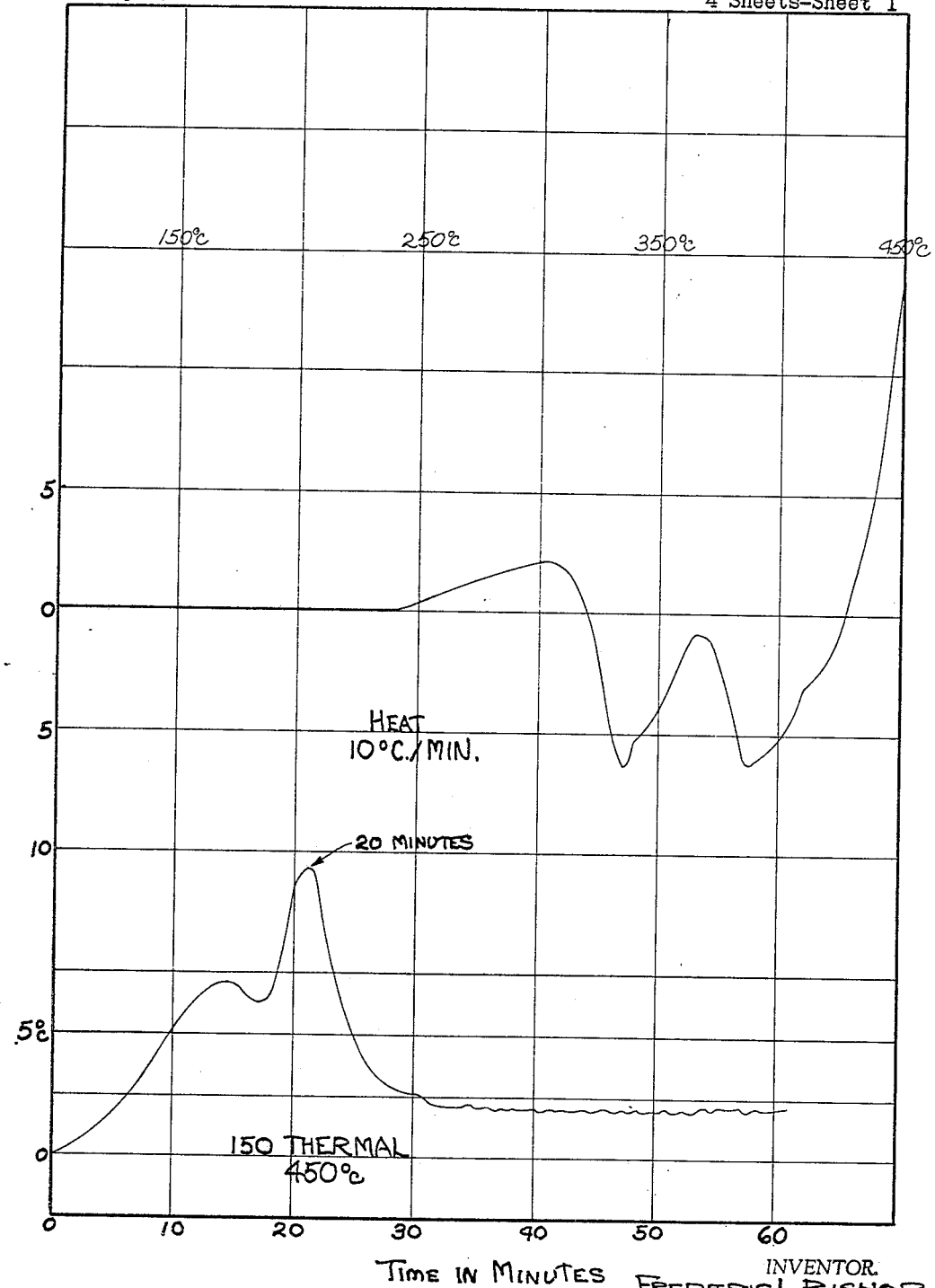
FIGURE 1 shows a curve for a solder glass that is essentially fluorine free. The composition for the instant solder glass is listed above as Example 9.
Figure 2:
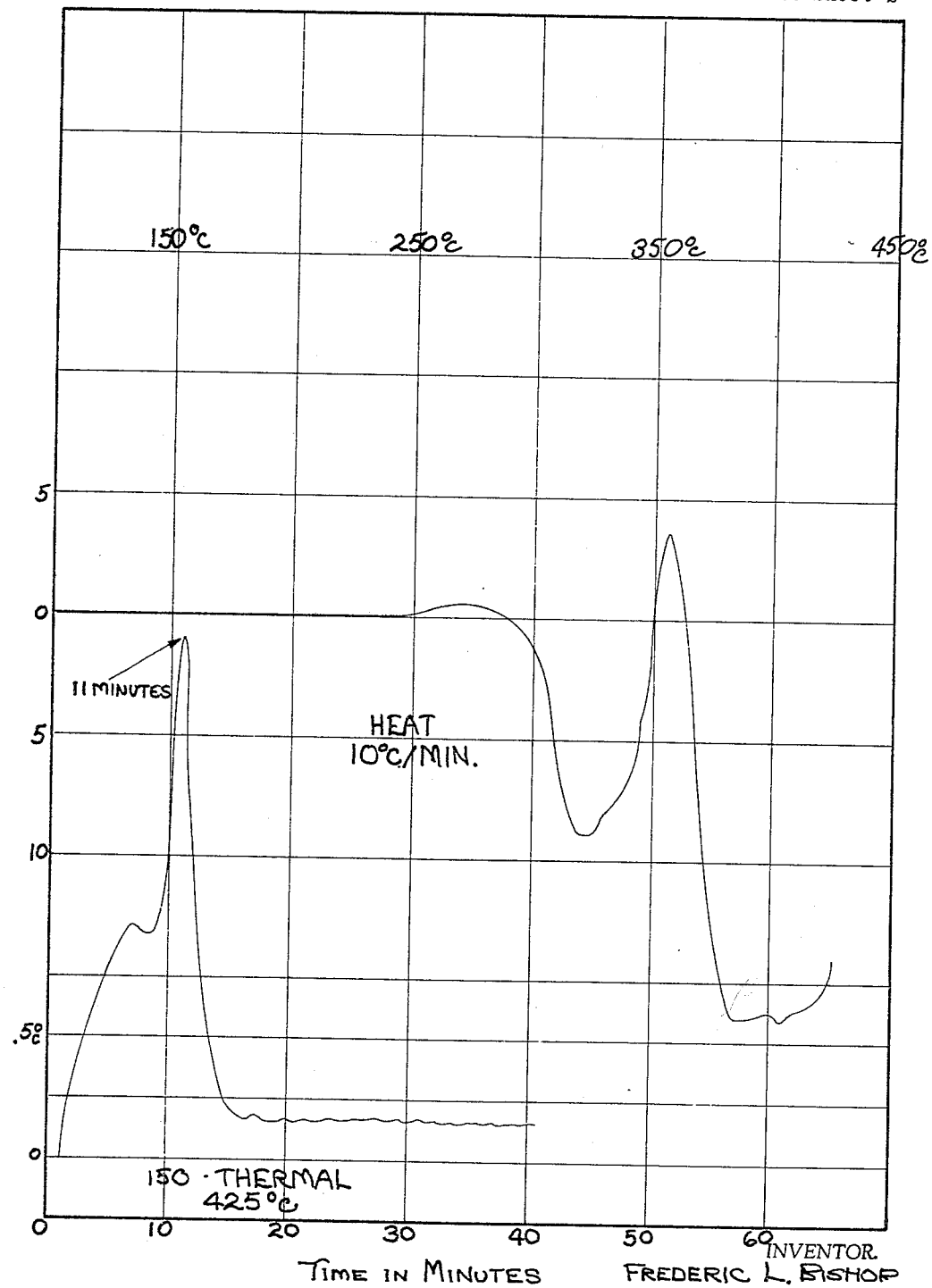
FIGURE 2 shows a curve for the same solder glass except that the solder glass has been modified to contain 1% fluorine. The solder glass composition depicted in this figure is the solder glass of Example 11.
Figure 3:
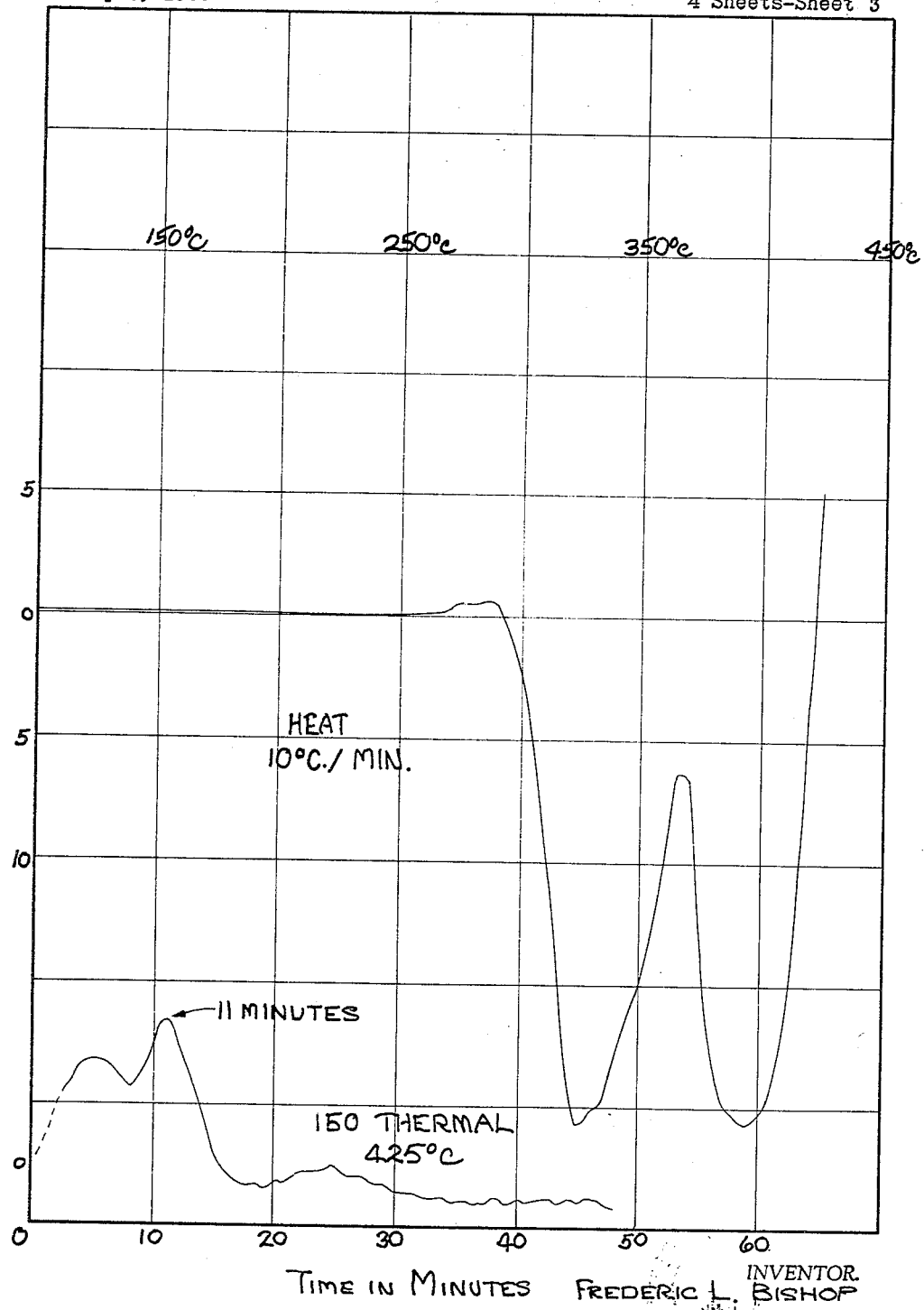
FIGURE 3 shows a curve for a different solder glass that is essentially fluorine free. The solder glass of this figure corresponds to Example 16.
Figure 4:
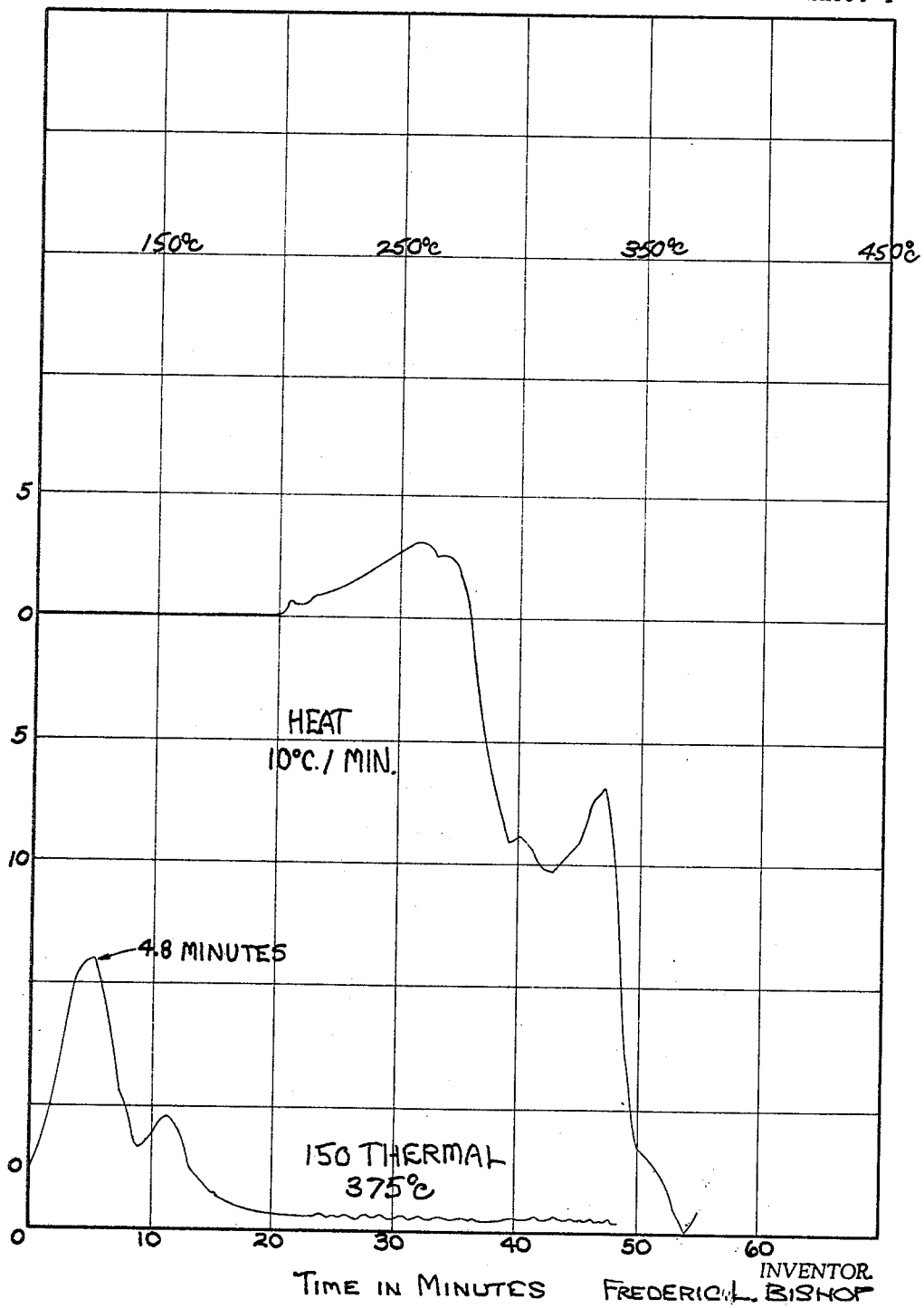
FIGURE 4 shows a curve for the same solder glass as shown in FIGURE 3 except that the solder glass has been modified to contain 2% fluorine. This is the solder glass of Example 18.

These curves show that the isothermal peak characteristics of the crystallization phase were moved ahead as fluorine was added to the solder glass compositions. Other characteristic peaks and valleys are less markedly changed. It appears from this analysis that the unexpected and unobvious results obtained lie in the sudden and complete crystallization for the subject solder glasses in a shorter time interval with accompanying lower temperatures.

The sealing glasses of the invention may be successfully employed by means well known to the art. For example, in making a seal between two glass surfaces to be joined, one or both of the surfaces is coated with a powder form or other particulate form of the sealing glass, and the parts are brought together and heated until a seal is formed and the sealing glass is crystallized, and thereafter the parts are cooled. In this manner, the seal is effected and homogenously devitrified throughout said seal. For convenience of application, the powder sealing glass is usually mixed with a liquid carrier to form a paste. Such carriers are well known to the art and include cellulose acetate, nitrocellulose, and the like. In any case, the carrier is one which is either evaporated or decomposed or both during the initial stages of the sealing process. An example of a suitable carrier is a dilute solution of nitrocellulose in amyl acetate.

While the sealing glasses of this invention are particularly suitable for sealing to glass surfaces, they are also useful for sealing other materials such as ceramics and metals.

As will be evident to those skilled in the art, various modifications of this invention can be made or followed in the light of the foregoing disclosure and discussion without departing from the spirit and scope of the disclosure and scope of the claims.

I claim:

1. A sealing glass composition consisting essentially of 0.75 to 1.25 weight percent $SiO_2$, 8 to 10 weight percent $B_2O_3$, 72 to 78 weight percent PbO, 10 to 15 weight percent ZnO, 0.2 to 2 weight percent CuO, and 0.5 to 2.5 weight percent fluorine, less 0.2 to 0.6 weight percent oxygen.

2. A sealing glass composition according to claim 1 wherein said sealing glass comprises about 1 weight percent $SiO_2$, about 75.3 weight percent PbO, about 12.7 weight percent ZnO, about 8.9 weight percent $B_2O_3$, about 2 weight percent fluorine, and about 1 weight percent CuO, less about 0.6 weight percent oxygen.

3. A sealing glass composition according to claim 1 wherein said glass composition comprises 1 weight percent $SiO_2$, 76 weight percent PbO, 12 weight percent ZnO, 9.5 weight percent $B_2O_3$, 1 weight percent CuO, and 1 weight percent fluorine, less 0.5 weight percent oxygen.

4. A sealing glass composition consisting essentially of 1.5 to 2.5 weight percent $SiO_2$, 7.5 to 10 weight percent $B_2O_3$, 70 to 80 weight percent PbO, 10 to 15 weight percent ZnO, 1 to 3 weight percent BaO, and 0.5 to 2.5 weight percent fluorine, less 0.1 to 1.0 weight percent oxygen.

5. A sealing glass composition according to claim 4 wherein said composition comprises about 2 weight percent $SiO_2$, about 74 weight percent PbO, about 2 weight percent BaO, about 12.5 weight percent ZnO, about 8.1 weight percent $B_2O_3$, and about 2 weight percent fluorine, less 0.6 weight percent oxygen.

6. A sealing glass composition according to claim 1 wherein said composition comprises 1% $SiO_2$, 9% $B_2O_3$, 12.8% ZnO, 75.7% PbO, 1% CuO, and 1% $F_2$, less 0.5 weight percent oxygen.

7. A sealing glass composition consisting essentially of 1.5 to 2.5 weight percent $SiO_2$, 7.5 to 10 weight percent $B_2O_3$, 70 to 80 weight percent PbO, 10 to 15 weight percent ZnO, 0.5 to 2.5 weight percent fluorine, less 0.1 to 1.0 weight percent oxygen.

8. A sealing glass composition according to claim 7 wherein said composition comprises about 2 weight percent $SiO_2$, about 75.5 weight percent PbO, about 12.8 weight percent ZnO, about 9.2 weight percent $B_2O_3$, and about 1 weight percent fluorine, less 0.5 weight percent oxygen.

9. A sealing glass composition according to claim 7 wherein said composition comprises about 2 weight percent $SiO_2$, about 75 weight percent PbO, about 12.7 weight percent ZnO, about 9 weight percent $B_2O_3$, and about 2 weight percent fluorine, less 0.7 weight percent oxygen.

References Cited

UNITED STATES PATENTS

| | | | |
|---|---|---|---|
| 2,889,952 | 6/1959 | Claypoole | 106—39 |
| 2,951,167 | 8/1960 | Kegg et al. | 106—39 |
| 3,055,762 | 9/1962 | Hoffman | 106—49 |
| 3,115,415 | 12/1963 | Hoffman | 106—53 |
| 3,291,586 | 12/1966 | Chapman et al. | 106—49 |
| 3,332,490 | 7/1967 | Burtch et al. | 106—39 |

FOREIGN PATENTS

| | | |
|---|---|---|
| 904,818 | 8/1962 | Great Britain. |
| 37/6264 | 6/1969 | Japan. |
| 40/224 | 1/1965 | Japan. |

HELEN M. McCARTHY, Primary Examiner

U.S. Cl. X.R.

65—33; 106—39